United States Patent [19]
Tamura et al.

[11] 4,306,969
[45] Dec. 22, 1981

[54] APPARATUS FOR SEWAGE PURIFICATION

[75] Inventors: Takaai Tamura, Mitaka; Tomeyoshi Ozawa, Musashino; Wataru Ito, Hachiouji; Norihiko Fujita, Musashino; Naoki Negishi; Yukihiko Tamaki, both of Tokyo, all of Japan

[73] Assignee: Industrial Research Institute, Japan

[21] Appl. No.: 94,561

[22] Filed: Nov. 15, 1979

[30] Foreign Application Priority Data

| Jul. 16, 1979 | [JP] | Japan | 54-90140 |
| Jul. 16, 1979 | [JP] | Japan | 54-90141 |
| Aug. 29, 1979 | [JP] | Japan | 54-110098 |
| Aug. 29, 1979 | [JP] | Japan | 54-110100 |
| Aug. 29, 1979 | [JP] | Japan | 54-10101 |

[51] Int. Cl.$^3$ .......................... C02F 3/20; C02F 3/22
[52] U.S. Cl. .................................. 210/201; 210/220; 210/255
[58] Field of Search ................. 210/195.3, 195.4, 290, 210/221 R, 14, 7, 3–6, 198–202, 255, 256

[56] References Cited

U.S. PATENT DOCUMENTS

| 3,439,807 | 4/1969 | Dantes | 210/220 |
| 3,807,565 | 4/1974 | Langston et al. | 210/220 |
| 3,878,097 | 4/1975 | Mochizuki et al. | 210/195.3 |
| 4,008,159 | 2/1977 | Besik | 210/195.3 |
| 4,086,160 | 4/1978 | Roesler | 210/195.3 |
| 4,219,424 | 8/1980 | Tamura et al. | 210/255 |

FOREIGN PATENT DOCUMENTS 2710109 12/1977 Fed. Rep. of Germany ... 210/195.3

Primary Examiner—Benoit Castel
Attorney, Agent, or Firm—Bernard, Rothwell & Brown

[57] ABSTRACT

An apparatus for purifying BOD-containing water by the action of activated sludge, which includes a vessel for containing activated sludge-containing liquid, and an aerator which is installed in the vessel. The aerator has a bubbler which successively takes out the liquid in the vessel for causing the liquid to absorb oxygen, and a settler which calmly returns the oxygen-rich liquid into the vessel.

2 Claims, 11 Drawing Figures

APPARATUS FOR SEWAGE PURIFICATION

BACKGROUND OF THE INVENTION

This invention relates to purification of sewage based upon the activated sludge method, and particularly to an apparatus for purifying sewage, which can be easily applied and installed into an aerator vessel of existing sewage purification facilities to strikingly increase the treating capacity.

In the most sewage purification devices, generally employed oxygen is supplied to the activated sludge by blowing air into a mixture of sewage and activated sludge contained in an aeration vessel. However, since the oxygen content in the air is small, large quantity of air must be blown to supply sufficient amount of oxygen. While the air rises through the liquid in the form of bubbles, the liquid tends to be excessively agitated. Hence, with the conventional sewage purification devices, in order to obtain the treated water which is substantially free from activated sludge, it is necessary to provide a settling vessel in which the aerated liquid is allowed to stay there for a predetermined period of time, during which the activated sludge precipitates.

SUMMARY OF THE INVENTION

It is an object of this invention to provide a sewage purification apparatus which is capable of supplying sufficient amount of oxygen to a liquid consisting of sewage and activated sludge without causing the liquid to be excessively agitated, and hence the sewage can be treated at a high efficiency.

Another object of this invention is to provide a sewage purification apparatus which is capable of supplying sufficient amount of oxygen to a mixture of sewage and activated sludge to be treated for achieving precipitation and separation of activated sludge in a single vessel.

A further object of the invention is to provide a sewage purification apparatus which is capable of supplying sufficient amount of oxygen to a liquid consisting of sewage and activated sludge without causing the liquid to be excessively agitated, and which can be installed in the existing vessels to perform a predetermined work.

A still further object of this invention is to provide an aerator which exhibits efficient aeration with a small power to a required portion of a liquid.

Yet another object of this invention is to provide a sewage purification apparatus wherein, for aerating a liquid containing sewage and activated sludge, air is employed in combination with oxygen-rich gas to materialize a high-treating efficiency without being accompanied by the defects resulting from the use of only a high-concentration oxygen gas.

The sewage purification apparatus according to this invention comprises a tank for containing a liquid consisting of BOD-containing water and activated sludge, and an aerator installed in the tank. The aerator functions to receive the liquid in the tank at a predetermined flow rate and to cause the liquid to absorb oxygen and then to return the liquid to the tank. The liquid is allowed to flow calmly. Therefore, the activated sludge in the liquid contained in the tank precipitates into the lower layer, so that a clear layer is formed in a region close to the surface of the liquid. The clear supernatant liquid contains very small amount of activated sludge, and can as required be sterilized so as to be drained out of the device. Namely, according to this invention, the aeration and precipitation are carried out in a single vessel.

DESCRIPTION OF THE PREFERRED EMBODIMENTS

Figure 1:
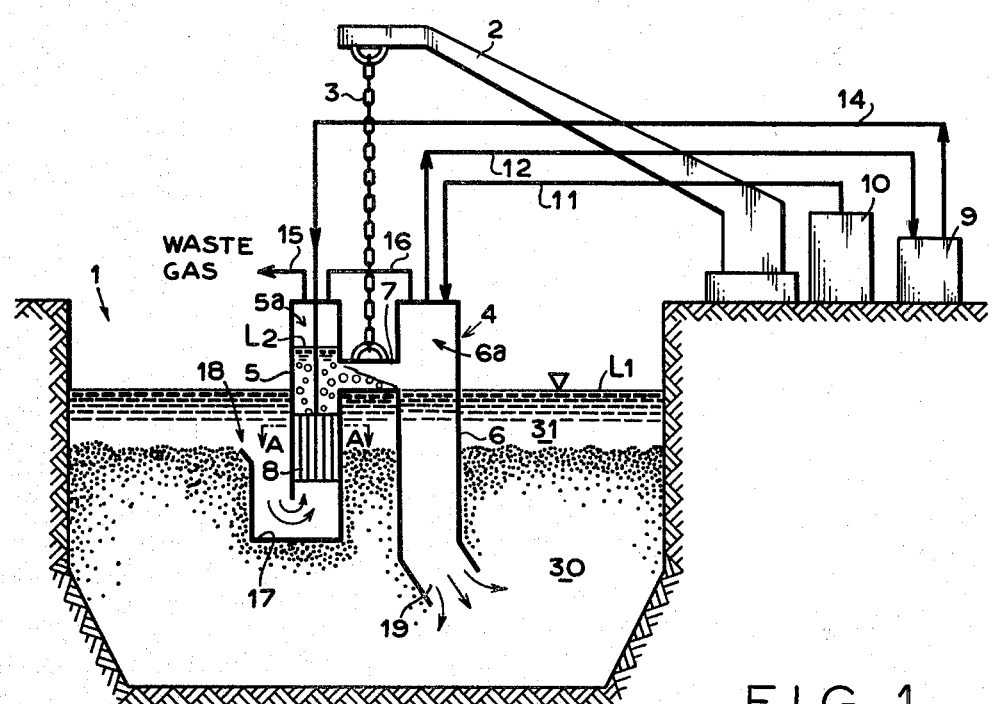
FIG. 1 is a sectional view schematically illustrating a sewage purification apparatus according to this invention.

A container or vessel made of a concrete as designated at 1 in FIG. 1 is provided for retaining a mixture of sewage to be treated, activated sludge and treated water which has been purified. The sewage is introduced, and the treated water and excess of sludge are drained, through paths, not shown. While the waste water is being properly treated, the liquid in the vessel 1 is separated into a layer (hereinafter referred to as sludge layer) 30 which contains large amount of activated sludge and a pure layer (hereinafter referred to as clean water layer) 31 which contains small amount of activated sludge.

Reference numeral 2 denotes a support arm secured to the outer side of the vessel 1. A free end of the support arm 2 reaches the central upper portion of the vessel 1, and supports an aerator 4 through a hanging rope or chain 3.

The aerator 4 comprises a cylindrical bubbler 5 and a settler 6 which are nearly vertically disposed, and connected together by a horizontally arrayed communication tube 7. In this embodiment, the communication tube 7 is held at such a position that its inner bottom surface is nearly in flush with the liquid level. In the bubbler 5 is installed a diffuser 8 which will be mentioned later. To the diffuser 8 is supplied an oxygen-rich gas from a pump or a blower 9. The oxygen-rich gas is first introduced from a suitable source 10 into a chamber 6a above the liquid level in the settler 6 via a path 11 made of a flexible tube and the like, and then supplied to the diffuser 8 via a path 12, the blower 9 and a path 14. The gas supplied from the diffuser 8 into a chamber 5a above the liquid level in the bubbler 5 is discharged to the open air through a path 15. A path 16 connects the chamber 5a and the chamber 6a together. When the gas in the chamber 5a is to be partly exhausted and the remainder is to be circulated, the circulating gas passes through the path 16.

At the lower end of the bubbler 5 is formed a guide 17 which forms a U-shaped path. An upwardly directed opening, i.e., an intake port 18 of the guide is positioned near the boundary between the sludge layer and the clean water layer in the vessel 1. Therefore, a mixture of sludge and waste water present in the upper portion of the sludge layer flows into the bubbler 5 via the intake port 18 formed by the guide 17.

Figure 2:
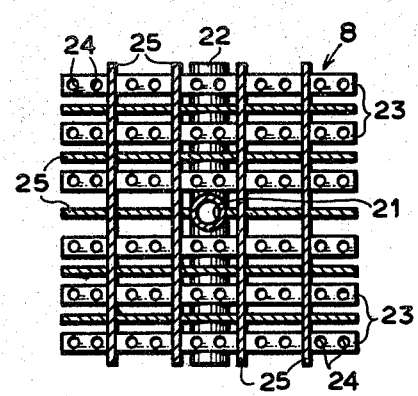
FIG. 2 is a sectional view, along the line A—A of FIG. 1, showing on an enlarged scale a diffuser used in the apparatus of FIG. 1.

As illustrated in detail in FIG. 2, the diffuser 8 employed in this embodiment comprises a pipe 21 connected to the path 14, a delivery pipe 22 which horizontally stretches beneath the pipe 21, and a plurality of diffuser pipes 23 which are arrayed perpendicularly on the delivery pipe 22. Therefore, the oxygen-rich gas supplied from the blower 9 to the pipe 21 via path 14 is then supplied to the individual diffuser pipes 23 via the pipe 22, and is blown into the liquid in the form of bubbles through holes 24 of diffuser pipes 23. Further, on the upper portion of the diffuser pipes 23 are provided separators 25 which are so disposed as to form a grid to divide the interior of the bubbler 5 into a plurality of paths each extending in the axial direction. The paths are effective for preventing air bubbles from coming into contact with each other to form larger bubbles, and to improve the contacting state between the liquid and the gas.

During the operation, the liquid introduced through the inlet port 18 of the guide 17 into the bubbler 5 is caused to rise through the bubbler 5 due to the air bubbles coming from the diffuser 8, whereby the liquid and the gas come into contact with each other. Since the oxygen-rich gas contains oxygen greater than that of the air, the oxygen content in the liquid increases in the bubbler 5. Moreover, the air bubbles cause the liquid level in the bubbler 5 to be raised from a position $L_1$ to a liquid level $L_2$ in the vessel 1. Hence, owing to the difference in liquid levels (difference between $L_1$ and $L_2$), the liquid in the bubbler 5 migrates into the settler 6 via the communication tube 7, and returns into the vessel 1 via an outlet port 19 located at the lower end of the settler 6.

Further, either by changing the angle of the support arm 2 or by changing the length of the hanging rope 3, the aerator 4 can be moved in a horizontal or vertical direction in the vessel 1 so that its position is arbitrarily adjusted.

As clear from the foregoing description, according to the sewage purification device of the present invention, a portion of the liquid in the vessel 1 continuously enters into the aerator 4 through intake port 18, absorbs sufficient amount of oxygen in the aerator 4, and flows out of the aerator 4 through the outlet port 19. The liquid flows so calmly that the activated sludge contained in the liquid in the vessel 1 is allowed to precipitate so that a supernatant liquid is formed on the upper layer. Therefore, the liquid which has overflown from the vessel 1 is clean and contains substantially no activated sludge, and need not be subjected to any further operation of precipitation for separation.

When the inlet port 18 is placed at the boundary between the sludge layer 30 and the clean water layer 31 as mentioned earlier, the liquid containing activated sludge at a rate smaller than that in the sludge layer is introduced into the aerator 4. Alternatively, the inlet port 18 may be located in the sludge layer 30 or in the clean water layer 31. When the gas blown into the bubbler 5 contains oxygen at greater concentration than 70%, it may often be desired to open a portion or a whole of the intake pipe 14 in the upper supernatant liquid to prevent oxygen from being absorbed in excess amounts by the activated sludge, so that the concentration of activated sludge in the liquid supplied to the bubbler 5 is decreased.

Figure 3:
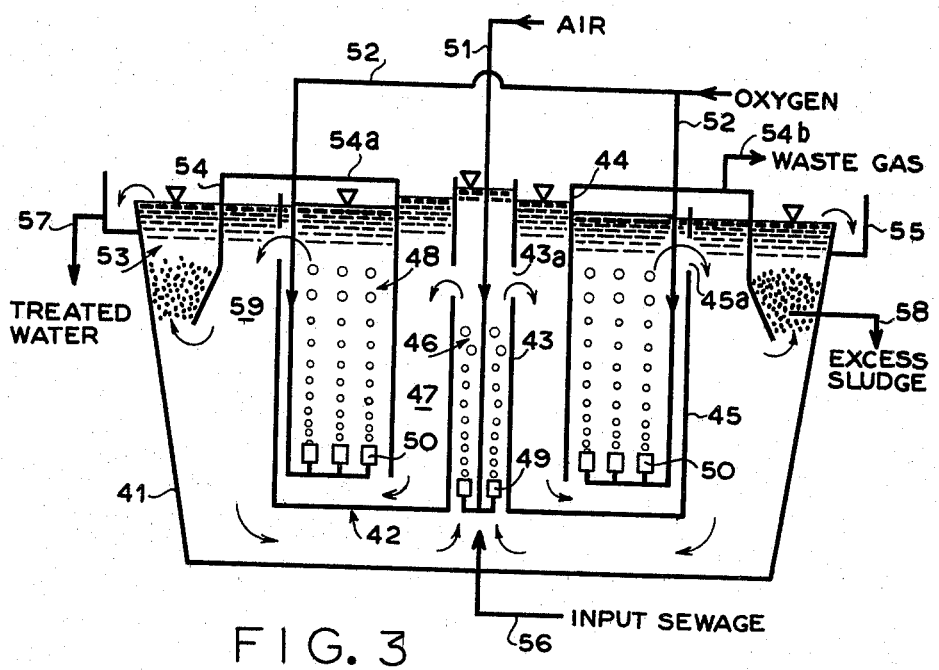
FIG. 3 is a sectional view illustrating a sewage purification apparatus according to another embodiment of this invention.

FIG. 3 illustrates another sewage purification apparatus according to the present invention. A vessel designated at 41 has its upper surface open, and accommodates an aerator 42. The aerator 42 comprises three cylindrical members 43, 44 and 45 which are arranged in concentric with each other, so as to form a primary aerating chamber 46, a settling chamber 47 and a secondary aerating chamber 48 therein. The primary aerating chamber 46 is communicated through its bottom with the vessel 41, and is further communicated with the settler 47 via an opening 43a formed at the upper portion of the cylinder 43. Further, the secondary aerating chamber 48 is communicated through its bottom with the bottom of the settler 47, and through its upper portion with the interior of the vessel 41 through an opening 45a.

Diffusers 49 and 50 are installed at the bottom portion of the primary aerating chamber 46 and the secondary aerating chamber 48, respectively. The diffuser 49 blows a flow of air supplied through a pipe 51 into the liquid in the primary aerating chamber 46, and the diffuser 50 works to blow the oxygen-rich gas supplied through a pipe 52 into the liquid in the secondary aerating chamber 48.

A separator 54 is provided in the vessel 41 to form an annular separating chamber 53 which is separated from a settling chamber 59, at an upper end portion of the peripheral wall. The separating chamber 53 temporarily stores the liquid in the vessel so that the activated sludge contained in the liquid precipitates and separates. The supernatant liquid overflows beyond the upper edge of the vessel 41 and enters to a receiving vessel 55.

The sewage to be treated is introduced from a pipe 56 to the bottom of the primary aerating chamber 46, and the treated water is taken out of the receiving vessel 55 via a pipe 57. Further, part of the activated sludge separated in the separating chamber 53 is drained as excess sludge through a pipe 58.

The air blown from the diffuser 49 into the liquid in the primary aerating chamber 46 disperses in the form of air bubbles into the liquid, dispels carbon dioxide contained in the liquid, and supplies oxygen to the liquid, and gives a rising force to the liquid. Consequently, the liquid rises in the primary aerating chamber 46 and migrates into the settler 47 through opening 43a. The air bubbles in the liquid separate away from the liquid while the liquid rises through the primary aerating chamber 46 and lowers through the settler 47, and the separated gas is exhausted to the open air.

The liquid which has reached at the bottom of the settler 47 enters into the neighboring secondary aerating chamber 48 where it receives the blow of oxygen-rich gas supplied from the diffuser 50 which is installed at the bottom portion of the chamber. The liquid rises through the secondary aerating chamber 48, and then flows through the opening 45a of the member 45 and enters into the vessel 41 through the chamber 59. Namely, the liquid in the vessel 41 passes through the primary aerating chamber 46, settler 47 and secondary aerating chamber 48, and returns to the vessel 41. The input sewage is combined with the circulating liquid at the bottom of the primary aerating chamber 46, and an amount of the liquid corresponding to the flow rate of the input sewage is taken out of the separating chamber, during which the liquid is subjected to a filtering action of the activated sludge particles to form a highly pure water.

Since the oxygen-rich gas is blown into the liquid in the secondary aerating chamber 48, which has been aerated by air, a sufficient amount of oxygen can be supplied to the liquid using a small amount of gas. A cover 54a disposed above the liquid level in the secondary aerating chamber 48 is provided for capture the gas which has passed through the liquid thereby to reuse the captured gas as a portion of the oxygen-rich gas through a pipe 54b. In this case, carbon dioxide which is generated from the liquid may be accumulated in the circulating gas. However, since carbon dioxide in the liquid in the vessel 41 is removed by the primary aeration in the primary aerating chamber 46, the concentration of carbon dioxide ($H_2CO_3$ concentration in practice) in the liquid is not excessively increased.

According to the sewage purification apparatus described above, the waste water or sewage containing activated sludge is subjected to the primary aeration by air and to the secondary aeration by oxygen-rich gas. Therefore, the aeration can be effectively performed using small amounts of oxygen without being accompanied by the problem of carbon dioxide accumulation, which may be encountered on the purification of the sewage containing BOD on the order of several thousand ppm. Therefore, as compared with the aeration performed using the air only, the apparatus of this invention will help to greatly enhance the treating efficiency. Further, as compared with the aeration using oxygen-rich gas only, the apparatus of this invention does not permit the efficiency to be decreased by the accumulation of carbon dioxide, and makes it possible to reduce the treating cost in accordance with the reduction in the amount of oxygen being used.

When the oxygen-rich gas only is used, the occurrence of trouble in the apparatus for producing oxygen may cause the supply of oxygen to be interrupted so that the activated sludge is disintegrated. According to this embodiment, however, even when the supply of oxygen is interrupted, the primary aeration is continued by the air, making it possible to prevent the activated sludge from being rotten, if a switching mechanism is provided so that the secondary aeration can also be effected with air, the treatment needs not be interrupted even though the treating efficiency will be decreased.

Although the primary aeration is effected using air and the secondary aeration is effected using oxygen-rich gas in the embodiment of FIG. 3, the above relation can be reversed. Namely, the primary aeration may be carried out using oxygen-rich gas and the secondary aeration may be carried out using air. In this case the chamber 47 can be closed at the top.

Figure 4:
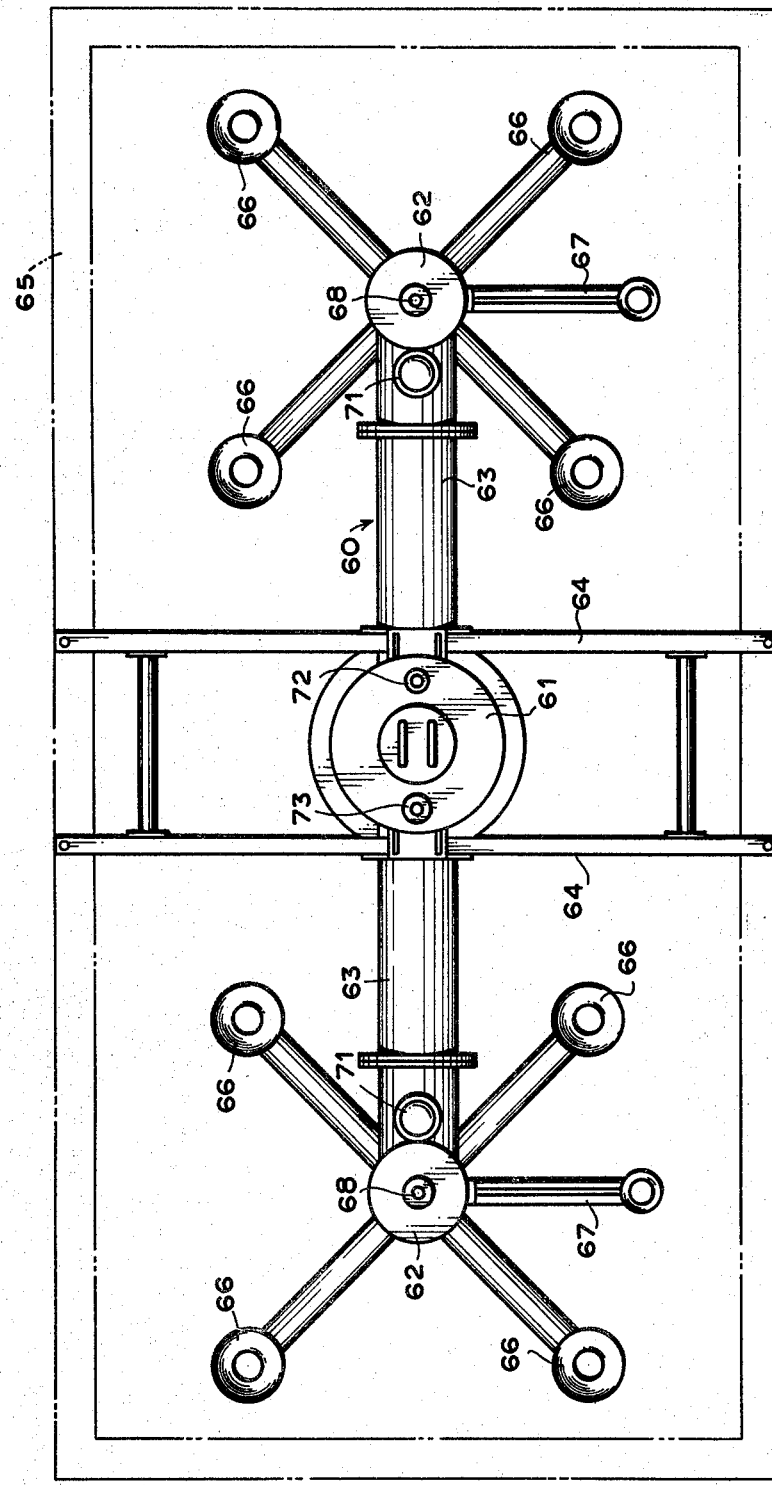
FIG. 4 is a plan view illustrating a sewage purification apparatus according to a further embodiment of this invention.
Figure 5:
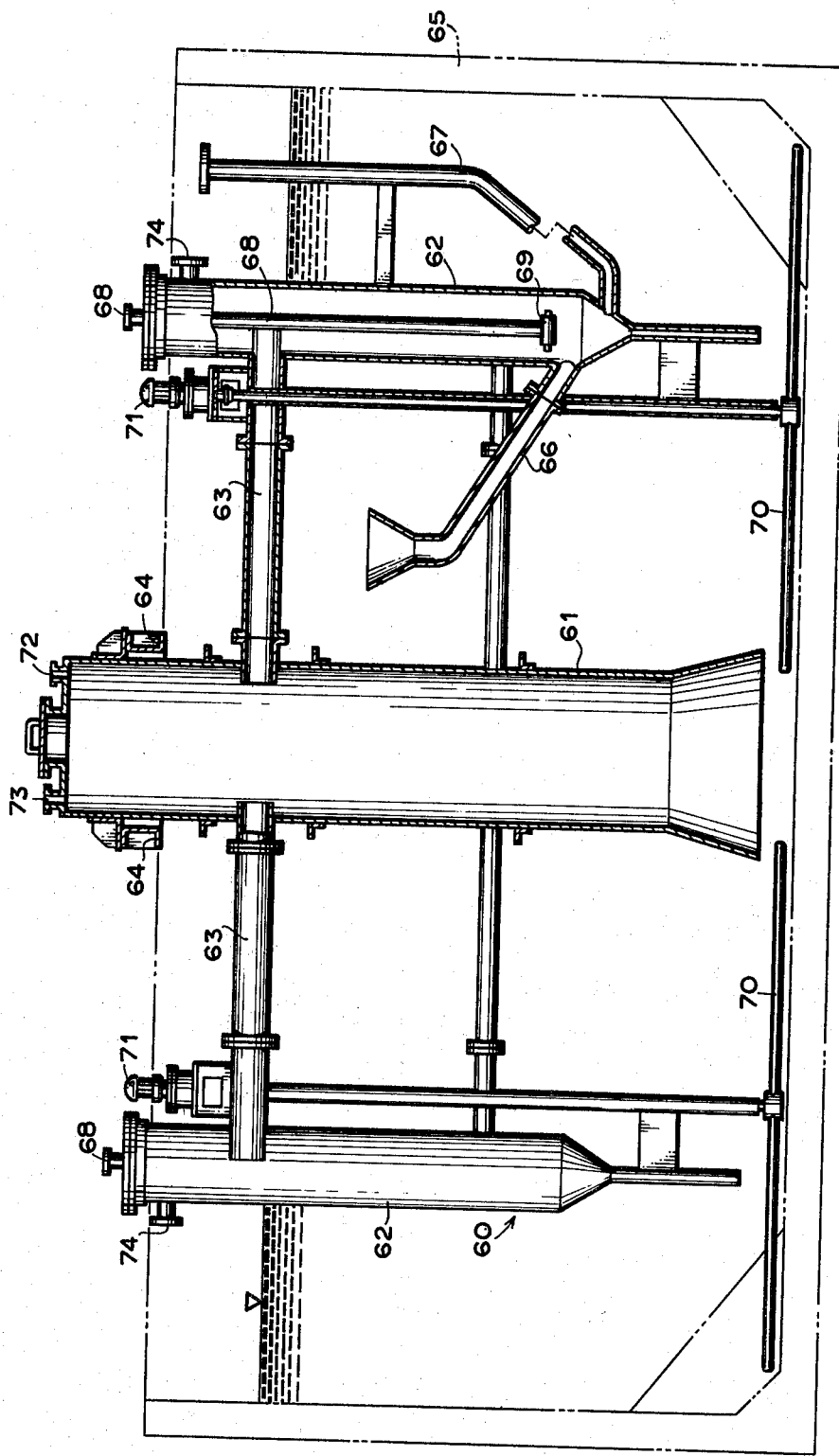
FIG. 5 is a side elevational view showing, in a partially cut-away manner, the apparatus of FIG. 4.

Referring to a sewage purification apparatus according to a further embodiment of this invention illustrated in FIGS. 4 and 5, an aerator 60 comprises a tubular settler 61 and two bubblers 62 each disposed vertically. Each bubbler 62 is of a tubular shape and is communicated with the settler 61 via a communication pipe 63. The settler 61 disposed at a predetermined position in the vessel by means of a suitable mounting member 64.

Each bubbler 62 is of a tubular shape with its both ends being closed as shown in FIG. 5, and has a plurality of intake pipes 66 (four in this case) that extent radially in the upwardly tilted direction. An end of sewage intake pipe 67 for introducing the sewage to be treated, is connected to a lower end of the bubbler 62. Namely, the sewage to be treated and the liquid in the vessel 65 are introduced into the bubblers 62 at their lower portions.

At the lower portion of each bubbler 62 is disposed a diffuser 69 attached to an end of a pipe 68 which penetrates through the upper wall of the bubbler 62. The diffuser 69 is provided for blowing oxygen-rich gas supplied through pipe 68 into the liquid in the respective bubbler 62. The gas blown into the liquid rises therethrough in the form of bubbles and supplies oxygen to the liquid. At the same time, the rising bubbles give a rising force to the liquid so that it rises in the bubblers 62.

As mentioned above, the interior of the bubblers 62 is communicated with the interior of the settler 61 via communication pipes 63. The liquid level in the vessel 65 is maintained constant owing to a weir (not shown), and the position of the inner bottom of the connection pipes 63 is set to be nearly in agreement with the liquid level. Accordingly, owing to the rising force of bubbles, flows of the liquid in the bubblers 62 rise to a position higher than the inner bottom surface of the connecting pipes 63, and flow into the settler 61 through communication pipes 63 due to a head.

The liquid which has flown into the settler 61 through communication pipes 63 gradually descends in the settler 61 and enters into the vessel 65 through an opening at the lower end of the settler 61. During this period, the air bubbles contained in the liquid escape therefrom, and the gas is collected at the top portion in the settler 61.

Preferably, in order to prevent the sludge from being accumulated on the bottom of the vessel 65, two stirrers 71 having rod-like rotary members 70 are installed being supported by the communication pipes 63. The rotary members 70 may rotate at a speed of 1 to 5 rpm.

The oxygen-containing gas blown into the liquid in the bubbler 62 may be air. When it is necessary to increase the amount of oxygen being supplied to cope with a high BOD concentration in the sewage to be treated, it is desired to use the oxygen-rich gas having a greater oxygen concentration than that of the air. In this case, the fresh oxygen-rich gas is introduced into the settler 61 through a supply port 72 provided at the top of the settler 61, and is fed under pressure from an outlet port 73 to the pipe 68 due to the blower via a pipe, not shown. The gas separated from the liquid in the bubbler 62 is taken out of the outlet port 74. It is desirable that part of the taken-out gas may be reused in a circulating manner. When air is used, the air may be directly fed into the pipe 68.

Figure 6:
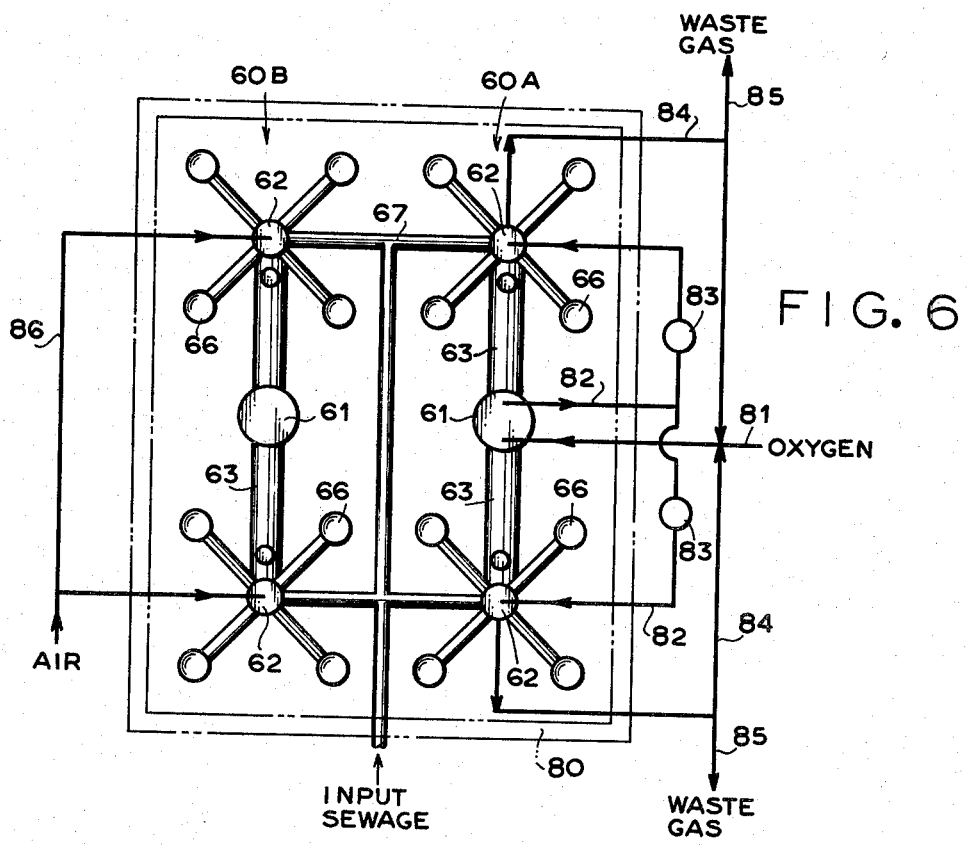
FIG. 6 is a plan view schematically illustrating a modified embodiment of the apparatus of FIGS. 4 and 5.

With reference to a modification of this invention illustrated in FIG. 6, two aerators 60A and 60B of the same construction as that illustrated in FIGS. 4 and 5 are disposed in a vessel 80. The oxygen-rich gas is supplied via a pipe 81 into a settler 61 of the aerator 60A, and then to the individual bubblers 62 via a pipe 82 having a blower 83. Hence, the aerator 60A operates in the same manner as that of FIGS. 4 and 5, to supply oxygen into the liquid in the vessel 80. Part of the gas separated from the liquid in the bubblers 62 is mixed into a gas supplied from a pipe 81 to the settler 61 via a circulation pipe 84 connected to a pipe 74, and the remainder of the gas is taken out as waste gas through a pipe 85.

The other aerator 60B is supplied with air at bubblers 62 through a pipe 86. Namely, with the aerator 60B, the gas blown into the liquid in the bubblers is air which functions to supply oxygen to the liquid and to dispel carbon dioxide dissolved in the liquid. Hence, even if oxygen or oxygen-rich gas is used in a circulating manner in the aerator 60A, the concentration of carbon dioxide in the liquid will be restricted at a lower level. When the sewage contains BOD at a low level, both aerator 60A, 60B can be supplied with oxygen-rich gas.

When a vessel having large floor areas is used, three or more aerators may be provided. In this case, it is desired to supply the air to the bubbler of at least any one of the aerators.

Figure 7:
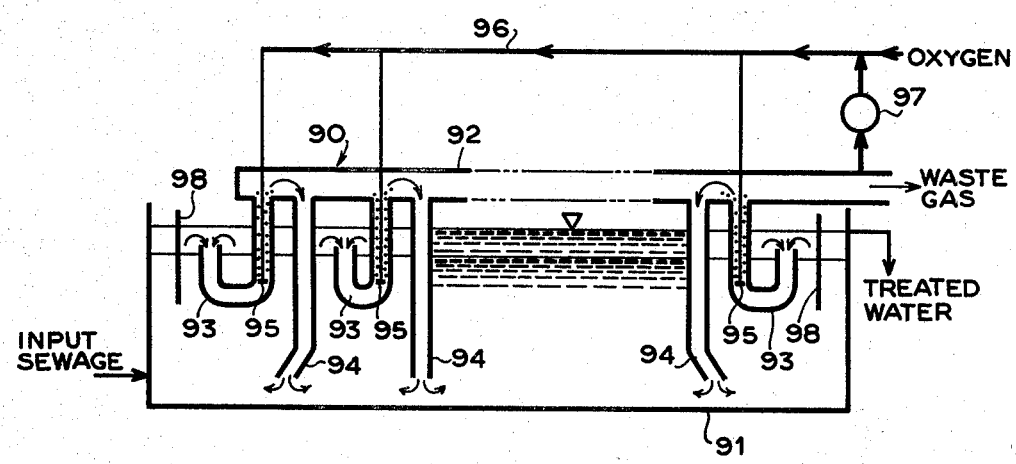
FIG. 7 is a sectional view schematically illustrating a sewage purification apparatus according to a modified embodiment of this invention.

FIG. 7 illustrates the construction of an aerator 90 which is suited for efficiently supplying oxygen to a liquid contained in a vessel 91 having relatively large volume. The aerator shown in FIG. 7 has a communication pipe 92 which is so arranged as to nearly horizontally extend above the liquid level in the vessel 91. A plurality of bubblers 93 and a plurality of settlers 94 are connected to the communication pipe 92. Each bubbler 93 is comprised of a U-shaped cylinder with its one end being connected to the communication pipe 92 and with its other end being open below the liquid level in the vessel 91, e.g., in the supernatant liquid. Each settler 94 is connected at one end to the communication pipe 92 and is open at the other end above the bottom of the vessel 91. When the bubblers 93 and settlers 94 are provided in an equal number, each settler is opened in the communication pipe 92 at a position close to the corresponding bubbler 93. The bubblers 93 and settlers 94, however, need not be provided in the equal number. In either case, the ends of the bubblers 93 and the settlers 94 are placed at predetermined portions in the vessel 91.

In each of the bubblers 93 at a bottom of vertical portion communicated with the communication pipe 92, are provided diffusers 95 which are connected via a pipe 96 to a source of oxygen-rich gas, not shown.

Figure 8:
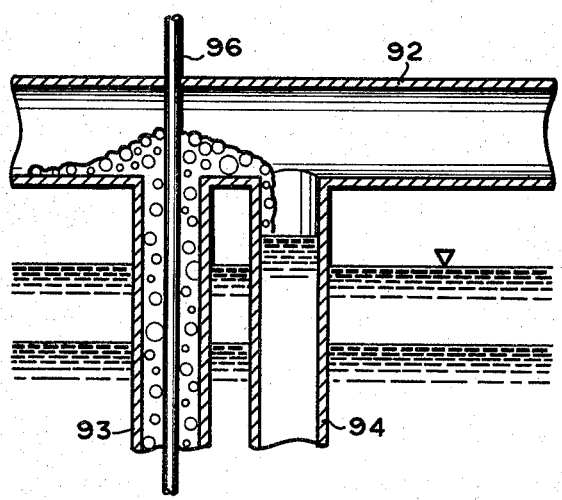
FIG. 8 is a sectional view illustrating the flow of a liquid in a portion of the apparatus of FIG. 7.

In the sewage purification apparatus above an oxygen-rich gas—a gas containing oxygen at a ratio greater than that of air—is supplied into the diffusers 95 via pipe 96 so as to be blown in the form of bubbles into the liquid present in each of the bubblers 93. The air bubbles cause the liquid in the bubblers 93 to absorb oxygen, and give a rising force to the liquid so that it rises from the bubblers 93 into the communication pipe 92. The liquid moves in the communication pipe 92 in the axial direction thereof and flows into a neighbouring settler 94. This state is illustrated in FIG. 8. The liquid passes through the settlers 94 and then returns to the vessel 91, during which the gas from the bubbles contained in the liquid flows into the communication pipe 92 and is guided to an end of the communication pipe 92 together with the gas separated on the upper side of the bubblers 93. The end of each bubbler 93 may be opened in the sludge layer so that oxygen is absorbed in the liquid which contains large amount of activated sludge. A considerable proportion of the exhaust gas from the communication pipe 92 may be circulated by a blower 97 into the pipe 96 for the purpose of efficient utilization of oxygen.

Although in FIG. 7 the sewage is introduced at the lower side of the vessel 91, it may be fed at the vicinity of diffusers 95 of bubblers 93, being divided into a plurality of streams to increase the treating efficiency. It is further possible to provide a separator 98 to enhance the effect for filtering the sludge, so that the treated water can further be cleaned.

Figure 9:
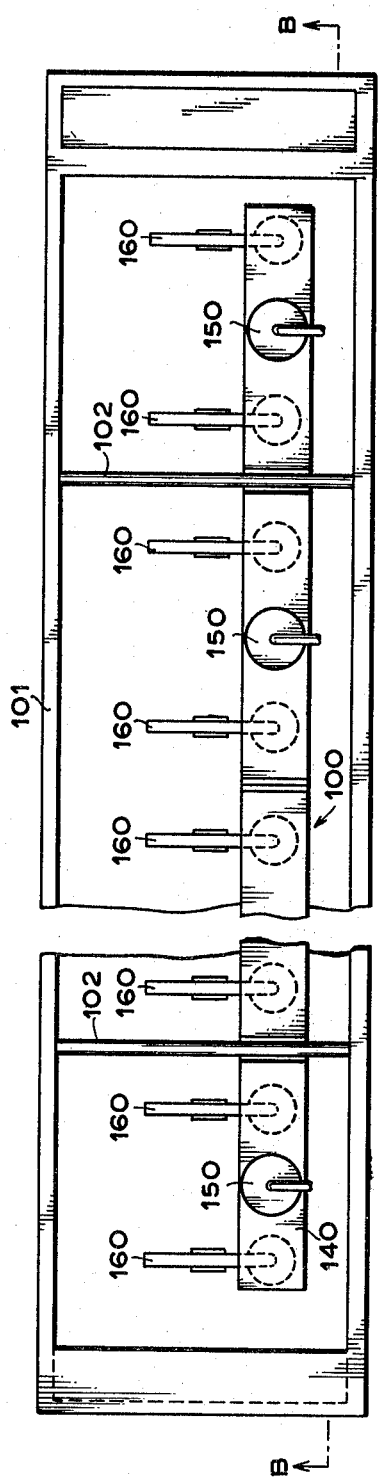
FIG. 9 is a plan view illustrating a further modified device according to this invention.
Figure 10:
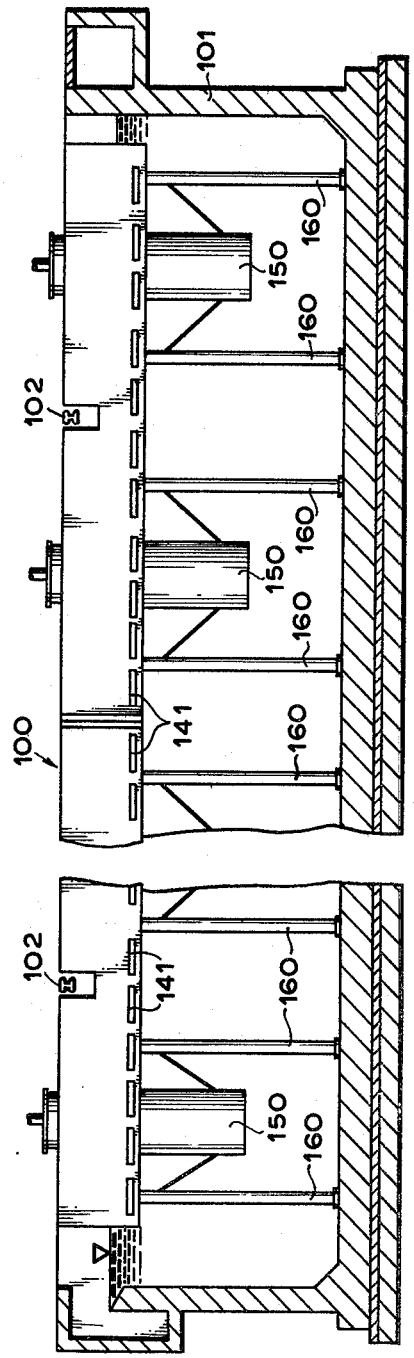
FIG. 10 is a sectional view along the line B—B of FIG. 9.
Figure 11:
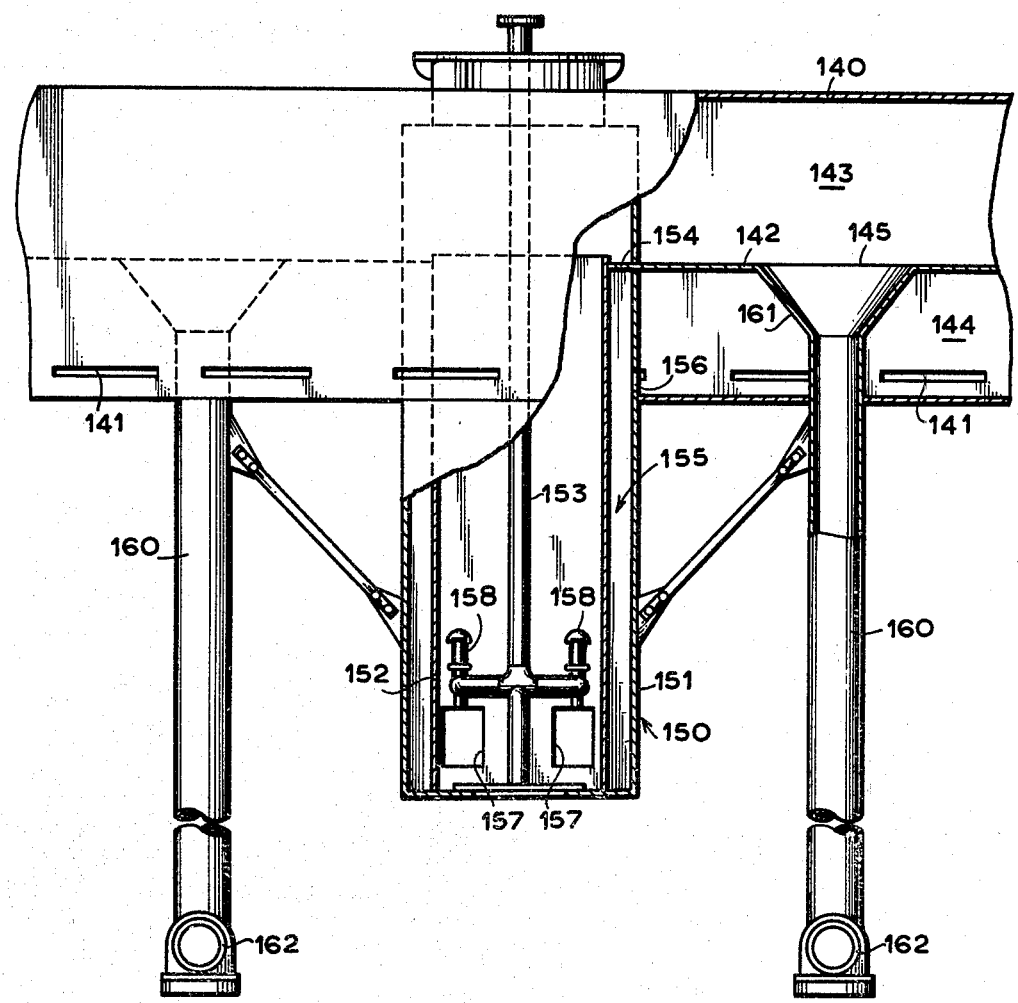
FIG. 11 is a partially cut-away side view showing, on an enlarged scale, a portion of the device of FIGS. 9 and 10.

In FIGS. 9 to 11 is shown a further modification of this invention, which includes a mechanism 100 for supplying oxygen to the liquid in a vessel 101 having a duct 140 extending along the liquid level in the vessel 101, so that a portion thereof is positioned under the liquid level. The duct 140 is equipped with sets of oxygen-supplying mechanisms, each comprising a bubbler 150 and a pair of settlers 160. In the duct 140 intake ports 141 are formed at a portion located below the liquid level, and the liquid flows into the duct 140 via the intake ports 141. Reference numeral 102 denotes a beam for supporting the duct 140 at a predetermined position.

As illustrated in detail in FIG. 11, the interior of the duct 140 is separated by a separator wall 142 into an upper chamber 143 and a lower chamber 144 which communicates with outside through the upper intake port 141. The settlers 160, each of which is of the shape of a pipe having conical portions 161 at the upper end thereof, are communicated with the upper chamber 143 of the duct 140 via an opening 145 formed in the separator wall 142, and also with the interior of the vessel 101 via directing pipes 162 which are provided at the lower end to extend in a horizontal direction.

The bubbler 150 has a vertically disposed cylindrical member 151 which penetrates through the duct 140, an inner cylindrical member 152 coaxially inserted in the outer cylinder 151 and a gas-supplying pipe 153. Between the outer member 151 and the inner member 152 is formed an annular chamber 155 which is closed by a plate 154 at the same level as that of the separator wall 142. The chamber 155 is communicated with the lower chamber 144 in the duct 140 via ports 156 formed in the outer member 151. The chamber 155 is further communicated with the interior of the inner member 152 via communication ports 157 formed in the lower end of the inner member 152. The upper end of the inner member 152 is opened in the upper chamber 143 in the duct 140. Thus, there is formed a flow path in which the liquid flows from the inlet port 141 through chamber 144, flow port 156, chamber 155, communication port 157, inner cylinder 152, chamber 143 and settler 160. A diffuser pipe 158 communicated with the gas-supplying pipe 153 is accommodated at the bottom portion of the inner cylinder 152. The diffuser pipe 158 acts to blow the oxygen-rich gas supplied from the oxygen source through the gas-supplying pipe 153 into the liquid in the inner member 152 in the form of fine bubbles.

In the sewage purification apparatus of FIGS. 9 to 11, the liquid in the vessel 101 is introduced into the lower chamber 144 in the duct 140 via inlet port 141. The liquid enters into the chamber 155 through port 156, and flows into the inner member through the communication port 157. The oxygen-rich gas from the diffuser pipe 158 is dispersed in the form of fine bubbles into the liquid in the inner member 152, so as to be effectively absorbed in the liquid, and to give a rising force to the liquid. Due to the rising force, the liquid rises in the inner member 152, flows over the upper end of the inner cylinder 152, and into the upper chamber 143 in the duct 140. The liquid then flows on the separator wall 142 in the lengthwise direction of the duct 140, reaches the opening 145 formed in the separator wall 142, and flows into the settler 160. While the liquid is gradually descending through the settler 160, fine air bubbles are separated from the liquid. Consequently, the liquid which is substantially free from bubbles is returned into the vessel 101 via the directing pipe 162 provided at the lower end of the settler 160. Namely, the liquid in the vessel 101 enters through the intake port 141, flows through the abovementioned flow path, and returns from the directing pipe 162 to the vessel 101. During this movement, oxygen from the diffuser pipe 158 is absorbed in the liquid. Therefore, when the liquid which has absorbed oxygen is mixed into the liquid in the treating vessel 101, the liquid supplies oxygen to the activated sludge to promote the action of biological oxidation of BOD substances. The same action is effected for all bubblers 150 and settlers 160 communicated with the common duct 140.

The individual bubblers 150 constitute independent aerator units together with a pair of neighbouring settlers 160. Therefore, when the oxygen-rich gas is used in a circulating manner, air may be supplied to one or a plurality of aerator units such that carbon dioxide in the liquid is dispelled.

According to the sewage purification apparatus of the present invention, the period of time in which the liquid is in contact with the oxygen-rich gas in the bubblers, i.e., the period of time in which the liquid passes through the bubblers will generally be 60 seconds or less, though it may differ depending upon many factors such as oxygen concentration in the gas, BOD concentration in the sewage and MLSS in the vessel. The pressure for supplying the oxygen-rich gas necessary for raising the liquid level in the bubblers maintaining a sufficient flow rate may be 5 meters in water head or smaller.

Too fast rising speed of the liquid in the clean water layer formed in the upper portion of the vessel disturbs the precipitation of the activated sludge. Therefore, the rising speed should preferably range from 0.1 to 5 cm per minute. Conversely, the flow of liquid in the bottom of the vessel should preferably be fast to attain good agitating effects for maintaining the floatation of the sludge. A line speed of 5 to 10 cm per minute is recommended.

The embodiment of FIG. 3 utilizes the aerator comprising a primary air aerating portion and a secondary oxygen-rich gas aerating portion which are connected in series with each other, and differs from another embodiments in that the intake port is disposed at the bottom of the vessel. In this case, a major portion of the downwardly flowing liquid from the settler 59 flows to the primary aerating chamber 46 at a relatively high flow rate, part of which then flows upwards to the chamber 53. With the flow pattern as above, the desirable rising speed of the liquid in the clear water layer is also from 0.1 to 5 cm per minute.

Design specifications and performance of the sewage purification device of the present invention illustrated in FIGS. 4 and 5 are shown in Table 1 in comparison with those of a conventional sewage purification device equipped with means for blowing the air into the liquid and a mechanical stirrer means.

TABLE 1

|  | Present invention | Conventional device |
|---|---|---|
| Quantity of sewage to be treated (m³/day) | 150 | 150 |

TABLE 1-continued

|  | Present invention | Conventional device |
|---|---|---|
| Total areas required for installation (m²) | 20 | 80 |
| Volume of vessel (m³) | 15 | 115 |
| Residence time in vessel (hr) | 2.4 | 18.4 |
| Consumption of electric power (KW) |  |  |
|   Waste water feeding pump | 3.4 | 8.9 |
|   Sludge returning pump | 0.4 | 3.7 |
|   Stirrer | Not necessary | 3.7 |
|   Defoaming pump | Not necessary | 1.5 |
|   Blower (15 m³/hr) | 1.1 | — |
|   Oxygen generator (1.5 m³/hr) | 1.5 | — |
|   Impeller (1 to 2 rpm) | 0.4 | — |
| Gas-liquid contact time (sec) in bubblers | 5–10 | — |
| Gas pressure in bubblers (meters in water head) | 1.5–2.5 | — |
| Rising speed of the liquid at the upper portion of vessel (cm/min) | 0.5–1.5 | — |
| Rising speed of the liquid at the bottom of vessel (cm/min) | 7.0–15.0 | — |
| Residence time in final precipitation tank (hr) | Not necessary | 6.8 |
| Amount of sludge returned (%) | Not necessary | 25 |
| BOD introduced (mg/l) | 200–300 | 200–300 |
| BOD removal (%) | 85–95 | 75–80 |
| MLSS (mg/l) | 4000–6000 | 1000–2000 |
| BOD (SS load) (Kg/SS Kg . day) | 0.2–0.8 | 0.1–0.4 |
| BOD (volume load) (Kg/m³ . day) | 2.0–3.0 | 0.3–0.4 |
| SVI | 80–100 | 80–100 |
| Age of sludge (days) | 4–5 | 3–5 |
| Amount of oxygen dissolved in the treated water (mg/l) | 3 or more | 0.5 |

In the foregoing were given some specific examples of the data. It was revealed that the average utilization efficiency of oxygen, when oxygen-rich gas is used, was as high as 76% as calculated in accordance with the following formulas.

$$\text{Amount of effective } O_2 \text{ (m}^3\text{/hr)} = \frac{(O_2 \text{ concentration } \% - 21) \times \text{Flow rate of gas (m}^3\text{/hr)}}{79}$$

$$\text{Utilization efficiency (\%) of effective } O_2 = \frac{\text{Effective } O_2 \text{ amount introduced (m}^3\text{/hr)} - \text{Effective } O_2 \text{ amount discharged (m}^3\text{/hr)}}{\text{Effective } O_2 \text{ amount introduced (m}^3\text{/hr)}} \times 100$$

$$\text{Amount of effective } O_2 \text{ introduced} = \frac{(85-21) \times 1.5}{79} = 1.22 \text{ m}^3\text{/hr}$$

$$\text{Amount of effective } O_2 \text{ discharged} = \frac{(59-21) \times 0.6}{79} = 0.29 \text{ m}^3\text{/hr}$$

$$\text{Utilization efficiency of effective } O_2 = \frac{1.22 - 0.29}{1.22} \times 100 = 76.2\%$$

Further, DO in the liquid was measured using a Beckman's dissolved oxygen analyzer at the center of the vessel, in the peripheral areas, and between the center and the periphery. The results in Table 2 indicate that according to the present invention, a uniform DO distribution is attained in the vessel with no oxygen shortage.

TABLE 2

| Measuring Positions | Depth of Liquid | | |
|---|---|---|---|
|  | 20 | 60 | 100 |
| Center | 3.2–4.1 | 3.2 | 1.1–2.3 |

TABLE 2-continued

| Measuring Positions | Depth of Liquid | | |
|---|---|---|---|
| | 20 | 60 | 100 |
| Periphery | 3.6 | 2.6–3.8 | 1.2–3.6 |
| Intermediate position 1 | 4.2 | 3.6 | 2.1–3.3 |
| Intermediate position 2 | 4.4 | 2.6–3.8 | 1.7 |
| Intermediate position 3 | 4.2 | 4.2 | 1.1–2.6 |
| Intermediate position 4 | 6.0 | 1.1–2.1 | 0.9–2.3 |
| Intermediate position 5 | 4.7 | 2.9–3.3 | 5.3 |

Table 3 below shows design specifications of the device of the present invention which is capable of treating BOD-containing water (200 mg/l) at a rate of 1000 m³ a day in comparison with those of a conventional apparatus.

TABLE 3

| | Present invention | Conventional device |
|---|---|---|
| Total areas required for installation (m²) | 472.62 | 757.76 |
| Total volume of aeration vessel and precipitation vessel (m³) | 84 | 1103.5 |
| Residence time in both vessels (hr) | 2.0 | 26.5 |
| consumption of electric power (KW) | | |
| Liquid-introducing pump | 11.2 | 11.2 |
| Blower | 8.2 | 34.5 |
| Stirrer | Not necessary | — |
| Oxygen generator (10 m³/hr) | 6.0 | — |
| Sludge treatment | — | 3.0 |
| Others | 1.4 | 1.4 |
| BOD removal (%) | 90 or more | 90 |
| MLSS | 5500–11000 | 2000–3000 |

What is claimed is:

1. A sewage purification apparatus comprising a vessel for containing a liquid of BOD-containing water and activated sludge and an aerator disposed in the vessel, said aerator comprising:

a plurality of settlers each of which is vertically disposed and has an outlet port at the lower end thereof;

a plurality of bubblers each of which is disposed in parallel with the corresponding settler and has an inlet port at the lower end thereof;

a diffuser in each of said bubblers for blowing an oxygen-rich gas into the liquid in the bubbler so that oxygen is absorbed in the liquid and so that the liquid is caused to rise toward the top of said bubbler;

a communication pipe for communicating said bubblers and said settlers for causing the liquid raised in said bubblers to be transferred into said settlers, said communication pipe extending in parallel with the liquid level in said vessel;

the upper ends of said settlers and the upper ends of said bubblers all being commonly connected to said communication pipe;

said communication pipe having a separator wall which divides the interior of the communication pipe into upper and lower chambers, said upper chamber being communicated with said settlers and said lower chamber being communicated with said bubblers;

each of said bubblers having an inner cylindrical member and an outer cylindrical member which are coaxially disposed and supported by said communication pipe, the interior of said inner cylindrical member being communicated with the upper chamber of said communication pipe, and a space defined between said inner and outer cylindrical members being communicated with the lower chamber of said communication pipe;

said communication pipe including ports in the lower portion thereof below the liquid level in said vessel for admitting liquid from said vessel into said lower chamber;

said outer cylindrical member of each of said bubblers including ports providing communication between said lower chamber and said space; and said inner cylindrical member including ports providing communication between said space and said inner cylindrical member, whereby liquid from said vessel is conducted to each of said bubblers.

2. The apparatus as defined in claim 1 wherein the upper ends of said inner cylindrical members and the upper ends of said settlers are connected to said separator wall in communication with said upper chamber.

* * * * *

UNITED STATES PATENT OFFICE
CERTIFICATE OF CORRECTION

Patent No. 4,306,969            Dated December 22, 1981

Inventor(s) Takaaki Tamura et al.

It is certified that error appears in the above-identified patent and that said Letters Patent are hereby corrected as shown below:

Front page of patent, under "Inventors" change "Takaai" to --Takaaki--.

Signed and Sealed this

Twenty-seventh Day of July 1982

[SEAL]

Attest:

GERALD J. MOSSINGHOFF

Attesting Officer      Commissioner of Patents and Trademarks